UNITED STATES PATENT OFFICE.

MAX GLASS, OF VIENNA, AUSTRIA-HUNGARY.

PROCESS OF BRIQUETING FINES OF ORE, FURNACE-DUST, WASTE METAL, WASTE IRON, &c.

958,700.     Specification of Letters Patent.     Patented May 17, 1910.

No Drawing. Original application filed December 11, 1909, Serial No. 532,603. Divided and this application filed March 31, 1910. Serial No. 552,723.

*To all whom it may concern:*

Be it known that I, MAX GLASS, a subject of the Emperor of Austria-Hungary, residing at 176 Hadikgasse, Vienna, Austria-Hungary, have invented certain new and useful Improvements in Processes of Briqueting Fines of Ore, Furnace-Dust, Waste Metal, Waste Iron, and Like Materials; and I do hereby declare the following to be a full, clear, and exact description of the invention.

The present application is a division of my application Serial No. 532,603, filed December 11, 1909.

The subject-matter of my invention is an improved process of briqueting fines of ore, furnace dust, waste metal, waste iron and like materials, such as smelting-products. ores in pieces or in granular or powdered condition as well as waste material containing iron, and consists in adding to the material solutions as binding agent, whose basic salts enable the material to be briqueted owing to the product maintaining its consistency sufficiently long under the action of the blast and of the heat of the smelting-furnace. Processes known heretofore for obtaining such briquets were too troublesome and expensive, as the material first had to be carbonized with organic binding agents or the briqueting operation itself had to take place in heat. Now according to my invention these basic salts which enable the material to be bound can be incorporated in the mass to be briqueted by introducing into the same salts which when treated in the mass, possibly with the coöperation of the basic material "lime," form insoluble compounds as binding means, the lime being also able to coöperate simultaneously in removing excess of moisture.

The subject-matter of my invention and the mode of carrying it into practice will now be described with reference to the following example: For this purpose, salts of the non-volatile silicic acid may be employed, when, using lime, the materials can be briqueted completely without having to employ heat. In this event, the material to be briqueted may be treated with solutions of water-glass and chlorid of calcium with an admixture of quicklime and, if desired, of borax, and pressed. To this end, the mass is first moistened with a solution of calcium chlorid so that all the pieces are covered on the entire surface as uniformly as possible, an excess of the solution being preferably avoided, however. Pulverized quicklime is then added to the mass and thereupon the water-glass solution is added in sufficient quantity to moisten the entire material while at the same time the use of an excess of water-glass solution is avoided. Finally, borax either dissolved in water or in the form of powder is added. Now, when the mass thus obtained is molded and exposed to pressure, sodium chlorid and calcium silicate are formed from the water-glass and calcium chlorid. The water which is present is absorbed by the added quicklime so that it is not necessary to drive the same off by heating. The addition of borax is favorable since it protects the briquets from oxidation or rusting when they are exposed for a long time to the atmosphere. In the event of the briquets being used for smelting purposes borax strengthens them in the smelting furnace since it melts, as is well-known, at a very high temperature and thus contributes to the binding action during the smelting process.

Material technical progress of the present process consists in the mass requiring to be moistened both with chlorid of calcium and with water-glass without excess, always only until the materials are covered by the substances in question on the entire surface in each case but no more. If an excess be present in consequence of unintentional surplus use of chlorid of calcium or water-glass solution, this excess can be equalized without the use of heat by employing more powdered quicklime which can only have an improving and preserving effect. Instead of moistening the material with chlorid of calcium it may first be moistened with water-glass, and, after adding quicklime, then have calcium chlorid solution added thereto.

My process may then be carried into practice, for example, as follows: The material to be briqueted is mixed with calcium chlorid and water-glass, the following chemical conversion taking place:

$$Na_2SiO_3 + CaCl_2 = CaSiO_3 + 2NaCl$$

and $$2CaSiO_3 + CaO + H_2O = CaH_2(SiO_3)_2 + 2CaO.$$

Accordingly, calcium silicate and sodium chlorid are formed. The silicate then acts as binding agent between the individual solid smallest parts of the material. The liberated water is taken up by the added quicklime, while the briquets are prevented from rusting by borax.

The reagents necessary for carrying this modified process into practice are made as follows: (1) 55 gr. calcium chlorid dissolved in one liter water, (2) 175 g. silicate of soda dissolved in one liter water, and to these solutions are added (3) 40 to 50 grs. borax likewise dissolved in one liter water, and (4) 50 to 60 grs. pulverized quicklime.

I claim:

1. In the process of briqueting ores the cementing together of the ore particles by a cementitious compound insoluble in water formed of a basic silicate.

2. The process of briqueting ores which comprises mixing the material with a solution of water-glass, a calcium compound and quicklime and pressing the same whereby a silicate is formed and acts as a binder, substantially as described.

3. The hereindescribed process of briqueting ore, which consists in uniformly moistening the material to be briqueted with a solution of calcium chlorid, adding quicklime thereto, uniformly moistening the mass thus obtained with water-glass solution, and in pressing the mass thus obtained, the quantity of calcium chlorid solution and water-glass solution used being only just sufficient to damp the surface of the masses treated thereby.

4. The hereindescribed process of briqueting ore, which consists in uniformly moistening the material to be briqueted with a solution of calcium chlorid, adding quicklime thereto, uniformly moistening the mass thus obtained with water-glass solution, adding borax thereto, and in molding and pressing the mass thus obtained, the quantity of calcium chlorid solution and water-glass solution used being only just sufficient to damp the surfaces of the masses treated thereby.

5. A briquet having its particles held together by cementitious compound insoluble in water formed of a basic silicate.

In testimony whereof I have signed my name to this specification, in the presence of two subscribing witnesses.

MAX GLASS.

Witnesses
AUGUST FUGGER,
ADA MARIA BERGER.